$t_a$ = WRITE 0
$t_b$ = WRITE 1
$t_c$ = READ 0
$t_d$ = READ 1
$t_e$ = WRITE SHATTER
$t_f$ = READ SHATTER

RALPH J. KOERNER
INVENTOR.

BY Arthur Freilich

ATTORNEY

INVENTOR.
RALPH J. KOERNER
BY Arthur Freilich
ATTORNEY

United States Patent Office 3,355,726
Patented Nov. 28, 1967

3,355,726
THREE STATE STORAGE DEVICE

Ralph J. Koerner, Los Angeles, Calif., assignor, by mesne assignments, to The Bunker-Ramo Corporation, Stamford, Conn., a corporation of Delaware Filed Dec. 30, 1963, Ser. No. 334,310
12 Claims. (Cl. 340—174)

This invention relates generally to digital storage means and more particularly to digital storage means which can be selectively driven to any one of three stable states.

Considerable work has been done in recent years directed toward the development of digital storage devices which can be used in large digital memories. This work has resulted in the provision of a great many different types of devices, each type possessing certain relative advantages and disadvantages. It has been the object of all of this development work to provide a device excelling in every one of a number of characteristics but, of course, as a practical matter, each type of device actually represents a compromise between the various characteristics desired.

It is generally considered important for digital storage devices to be capable of switching states extremely rapidly. It is of perhaps prime importance that the cost of the devices not be excessive. The reliability of the devices, of course, also represents an extremely important characteristic. It is additionally often desired that the device be capable of being read nondestructively, and likewise it is often desired that the device be adaptable for use in a coincident current type of memory. Further, it is important that the signal levels required for writing and available on reading are of magnitudes which do not require excessively expensive drivers and sense amplifiers.

Although a great amount of work has been performed directed toward providing a device representing an optimum compromise of these aforementioned characteristics, relatively little attention has been paid to the development of anything but binary storage devices. The reason for this undoubtedly is that to date it has been found that data represented in some type of binary format can be most easily and inexpensively processed.

There are, however, many applications in which a three state storage device would be extremely useful even though data is essentially represented in a binary format. For example, there are binary storage devices extant which, when interrogated, provide one polarity output pulse if the device is in a first state and an opposite polarity pulse if the device is in a second state. In certain applications, it would be useful if the device could be switched to some third state in which it would, for example, provide no output pulse when interrogated.

Consequently, it is an object of the present invention to provide a storage device together with driver means for selectively causing said storage device to define any one of three states.

It is a more particular object of this invention to provide such a storage device which is relatively inexpensive, extremely fast in operation, can be read nondestructively, can be used in a coincident current type of memory, and which requires relatively low input signal levels and provides adequate output signal levels.

It is a further object of this invention to provide a method of operating a storage device for selectively causing it to define any one of three states.

A three state storage device having the aforementioned characteristics can, for example, find significant utility in content addressable memory implementations, one such implementation being disclosed in U.S. patent application Ser. No. 269,009, filed Mar. 29, 1963, and assigned to the same assignee as the present application, and it is a further object of this invention to provide a content addressable memory in which selected portions of selected stored words can be masked so that memory searches can be performed with respect to only the unmasked portions of the words.

That is, in content addressable memories in which a search word is simultaneously compared with a plurality of stored words, it is sometimes desirable to compare only a portion of a selected stored word with the search word. For example, assume that each stored word corresponds to a different day of the year and, in different portions thereof, respectively contains time of day information, temperature information, and humidity information. Also let it be assumed that the thermometer at 12 noon on June 10 was operating improperly and that as a consequence it is desired to store a word containing the 12 noon time of day information, the corresponding humidity information (e.g., 80%) and to delete any data in the temperature information portion of the word. Let it further be assumed that it is desired to ascertain those days during the year on which at 12 noon the temperature was 70° and the humidity was 80%. If the storage devices storing the temperature information portion of the June 10 stored word had defined temperature information other than 70°, these storage devices would have developed mismatch signals in the course of a search and thus June 10 would not have been indicated as matching the searched for condition. However, if the storage devices storing temperature information defined a third state, then they would not develop mismatch signals and the June 10 entry could be listed as possibly being one of those sought days. Thus, the utility of masking a selected portion of a selected stored word has been demonstrated. This type of masking is to be distinguished from the type of masking in which a portion of the search word is masked. That is, although a search could be conducted only for time of day and humidity information which would turn up the June 10 entry, such a search would fail to disclose those days on which at 12 noon the temperature was 70° and the humidity reading was inaccurate because of some equipment malfunction. Admittedly, two successive searches could be performed to disclose both types of stored words, but this of course would require more processing time than is required by masking portions of the stored words. This difference in processing time can become very great, of course, when data words contain several different pieces of information.

Thin magnetic film storage devices are useful in a great variety of memory applications, including content addressable memories. Such devices exhibit what is referred to as domain or coherent behavior. With the introduction of uniaxial anisotropy (i.e., one preferred axis of magnetization), these films are bistable and can be caused to switch magnetization directions by domain or coherent rotation rather than by domain growth. Rotational switching proceeds simultaneously across the domain whereas domain growth is a sequential and thus much slower process. Inasmuch as devices such as conventional toroidal ferrite cores ordinarily switch by domain growth, thin films can be switched much faster than cores. Switching in response to fields directed along the axis of anisotropy produces a very square hysteresis loop defining two residual magnetization states suitable for binary storage. A magnetic field directed transverse to the axis of anisotropy and in the plane of the film can be loosely considered as rotating the domain magnetization so as to increase axial field leverage. Domain magnetization is unstable when rotated to a position perpendicular to the antisotropy axis, and a very small field along the axis will cause it to rotate in the direction of the axial field upon the removal of the transverse field. Thus, binary information can be selectively written into the film. When the transverse field is applied alone and its magnitude is less than some value which depends upon the physical parameters of the particular film, its effect is to temporarily rotate the domain magnetization vector toward the applied field. Upon removal of the transverse field, the magnetization vector snaps back to its former direction along the anisotropy axis. This effect provides the basis for nondestructively reading stored binary information.

Briefly, the present invention is based on the recognition that the domain or coherent behavior normally exhibited by thin magnetic films can be selectively shattered by the application of a large enough transverse field. Once the single domain structure shatters to become many independent mutually cancelling domains, the film will no longer provide any output signal when interrogated.

In a preferred embodiment of the invention, a particular type of thin film device, i.e., a wire storage element, is employed in a content addressable memory.

The wire storage element is a thin film device in which a magnetic film, for example, a nickel-iron-cobalt alloy, is electroplated on the surface of a polished copper wire so that the film forms a thin closed cylindrical shell. Circumferential uniaxial anisotropy is induced in the shell. A plurality of wire storage elements can be coupled in a content addressable memory matrix with each wire storage element corresponding to a different memory location. Cells are delineated in the continuous plating along each wire element by the region of influence of transverse field producing solenoids wound therearound. A first transverse field-producing solenoid associated with each cell is connected in common, in columnar fashion, with correspondingly positioned cells in all other memory locations. A second transverse field-producing solenoid associated with each cell is coupled to all of the cells in the same memory location. Each storage element wire is connected to a different switch means which can couple the wire either to a sense amplifier or a driver.

In order to selectively write either a first or second state into any storage cell, appropriate signals are applied to the storage element wire and first transverse field-producing solenoid associated with that cell. In order to mask information stored in a particular cell, i.e., shatter the domain thereof, appropriate signals are applied to both transverse field-producing solenoids associated with that cell. In order to search a particular column of cells, an interrogating signal is applied to the first transverse field-producing solenoid associated with those cells, and each storage element wire is coupled through switch means to a different sense amplifier. The search can then, for example, be conducted in the manner disclosed in the aforecited U.S. patent application. It is pointed out, however, that although the preferred embodiment of the invention represents an extremely useful content addressable memory implementation, the three state storage device disclosed herein finds utility in other content addressable memory implementations and in many other memory applications.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIG. 1(*b*) is a waveform chart indicating various waveforms for writing and reading each of the three states which can be defined by the storage device of FIG. 1(*a*)

Figure 1:
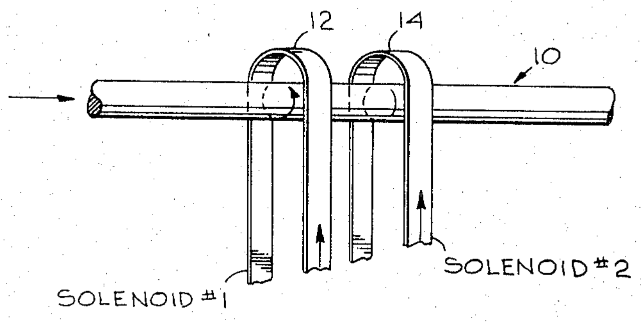
FIGURE 1(*a*) is a diagrammatic perspective view of a storage device constructed in accordance with the present invention.
Figure 1:
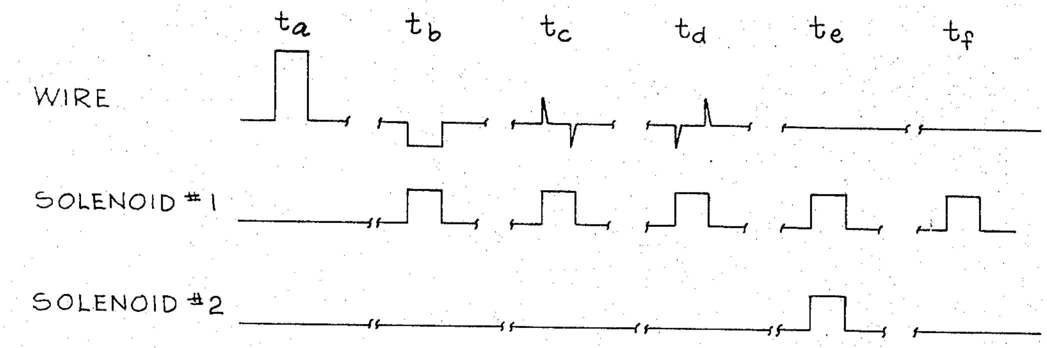

Attention is now called to FIG. 1(*a*) which illustrates a preferred embodiment of a storage device in accordance with the invention herein. As discussed in the literature, binary information can be readily stored in and nondestructively read from thin magnetic film having a uniaxial anisotropy characteristic. Such films exhibit single domain or coherent behavior which permits the direction of magnetization in such films to be very rapidly reversed. As pointed out in the introduction to the present specification, such switching is characterized as rotational switching and proceeds virtually simultaneously across the film, whereas more conventional switching, as is characteristic of toroidal ferrite cores, is a sequential process which proceeds by domain growth. Generally, the term "thin magnetic film" refers to a class of films having a thickness of less than 12,000 angstroms. Such films can be deposited as spots on a substrate or can be deposited, as shown in FIG. 1(*a*), on the peripheral surface of a conductive wire. More particularly, an appropriate wire storage element is provided by plating a magnetic film of a nickel-iron-cobalt alloy on the surface of a polished copper wire with the film forming a thin closed cylindrical shell about the wire. The wire storage element in FIG. 1(*a*) is designated generally by the numeral 10.

Circumferential uniaxial anisotropy can be induced in the film in two ways: (1) a large crystal orienting, circumferential field can be provided during plating as by passing a current along the copper wire and (2) natural geometrical anisotropy results from the closed magnetic flux path around the wire. The geometry of the wire element illustrated in FIG. 1(*a*) endows it with advantageous characteristics not common to ordinary planar film arrays. More particularly, whereas spot thickness is usually held to less than 2,000 angstroms in planar film arrays in order to maximize the spot length-to-thickness ratio, and thus minimize the demagnetization effects which result from pole formation at the terminals of an open path magnetic structure, the geometry of the wire storage element 10 provides a closed path magnetic structure having no demagnetizing pole effects, thereby enabling the film to be deposited on the wire in thicknesses approaching 12,000 angstroms. Increased thickness results in correspondingly increased output signals which, as will be more readily appreciated hereinafter, is extremely desirable where the storage element is utilized in a content addressable memory where a multiplicity of sense amplifiers is required.

As noted, the axis of anisotropy extends circumferentially about the wire with the magnetic field extending in either a clockwise or counterclockwise direction. The two directions of magnetization can respectively represent binary states. A magnetic field along the axis of anisotropy produces a very square hysteresis loop defining two different residual magnetization states. In order to initiate switching in the film, some minimum value $H_c$ of field intensity along the axis of anisotropy is required. This minimum value can be reduced by simultaneously providing a magnetic field extending transverse to the axis of anisotropy. As a consequence of the minimum field intensity value required for switching changing in the presence of a transverse field, thin film storage elements can be utilized in matrices using coincident write selection techniques. Thus, consider FIG. 1(*b*) which illustrates at time $t_a$ the signal which can be applied to the storage element wire for developing an axial field having a value greater than $H_c$ for switching the direction of film magnetization in a first direction to write a binary "0" therein.

A transverse field can be developed by driving a current through either a solenoid 12 or 14, each of which loops around the wire storage element 10. It will be recalled that the region of influence of the transverse field-producing solenoids 12, 14 defines the boundaries of a storage cell or domain. As noted, the effect of providing a transverse field is to reduce the minimum axial field value necessary for switching. For conceptual purposes, one can view the transverse field as rotating domain magnetization so as to increase axial field leverage. Domain magnetization is unstable when rotated to a position perpendicular to the anisotropy axis and a very small field along the axis will thus orient the magnetization in the direction of the applied field upon removal of the transverse field. Thus, in lieu of providing an axial field greater than $H_c$ as was provided at time $t_a$, a transverse field could be developed, as by driving a current through solenoid 12, which would then require a considerably smaller axial field to switch the domain. This fact is demonstrated at time $t_b$ where the signals necessary to write a "1" are illustrated. That is, a transverse field developed by the current in solenoid 12 acting in conjunction with a small field developed by driving a current through the storage element wire, causes the domain magnetization to switch to define a binary "1" state.

In order to read the state stored in a cell, a transverse field, less than a predetermined value, can be provided in the absence of any developed axial field. The effect of providing such a transverse field is to temporarily rotate the domain magnetization vector toward the applied field. Upon removal of the transverse field, the magnetization vector snaps back to its former direction along the anisotropy axis and induces an output signal in the storage element wire. Inasmuch as the magnetization vector is rotated from opposite starting positions corresponding to the two binary states, opposite polarity output signals will be induced in the storage element wire. Thus, if a binary "0" is stored in the domain, a transverse interrogating field will induce the output signal shown at time $t_c$ on the wire, while if a binary "1" is stored, then the same transverse interrogating field will induce an opposite polarity signal on the wire, as indicated at time $t_d$.

It has been found that so long as the transverse field applied to the film is of an intensity less than that of the anisotropic field, the state of the film can be continually interrogated with virtually no deterioration of the output signal provided thereby. Thus, if the film stores a binary "1," the application of a transverse interrogating field will continue to induce the output signal indicated at time $t_d$ on the wire. However, in accordance with the invention, it has been recognized that if a transverse field of an intensity greater than that of the anisotropic field is applied to the film, as by simultaneously driving currents through both solenoids 12 and 14, as indicated at time $t_e$, the single domain structure in the film shatters to become many independent mutually cancelling domains. That is, there is essentially zero magnetization in the circumferential direction. Subsequent transverse field interrogations, as for example shown at time $t_f$, will fail to induce any signal on the wire. Thus, a cell subjected to an excessive transverse field is switched "off" while other cells defined on the same wire storage element which are not exposed to the excessive transverse field will continue to operate normally. A shattered domain therefore defines a third state which can in effect store information as meaningful as that stored when the first and second states are defined. A cell can be switched from the third state to either the first or second states by merely selectively writing either a binary "0" or a binary "1" in the manner aforedescribed.

Storage devices which are capable of defining three distinct states and which can be satisfactorily operated in coincident write modes can find utility in a great number of applications. One such application is disclosed in the content addressable memory implementation illustrated in FIG. 2 in which the third state is effectively used for masking unwanted information stored in memory so that the masked information plays no part in determining whether the stored word, of which it forms a part, matches or mismatches a search word.

Figure 2:
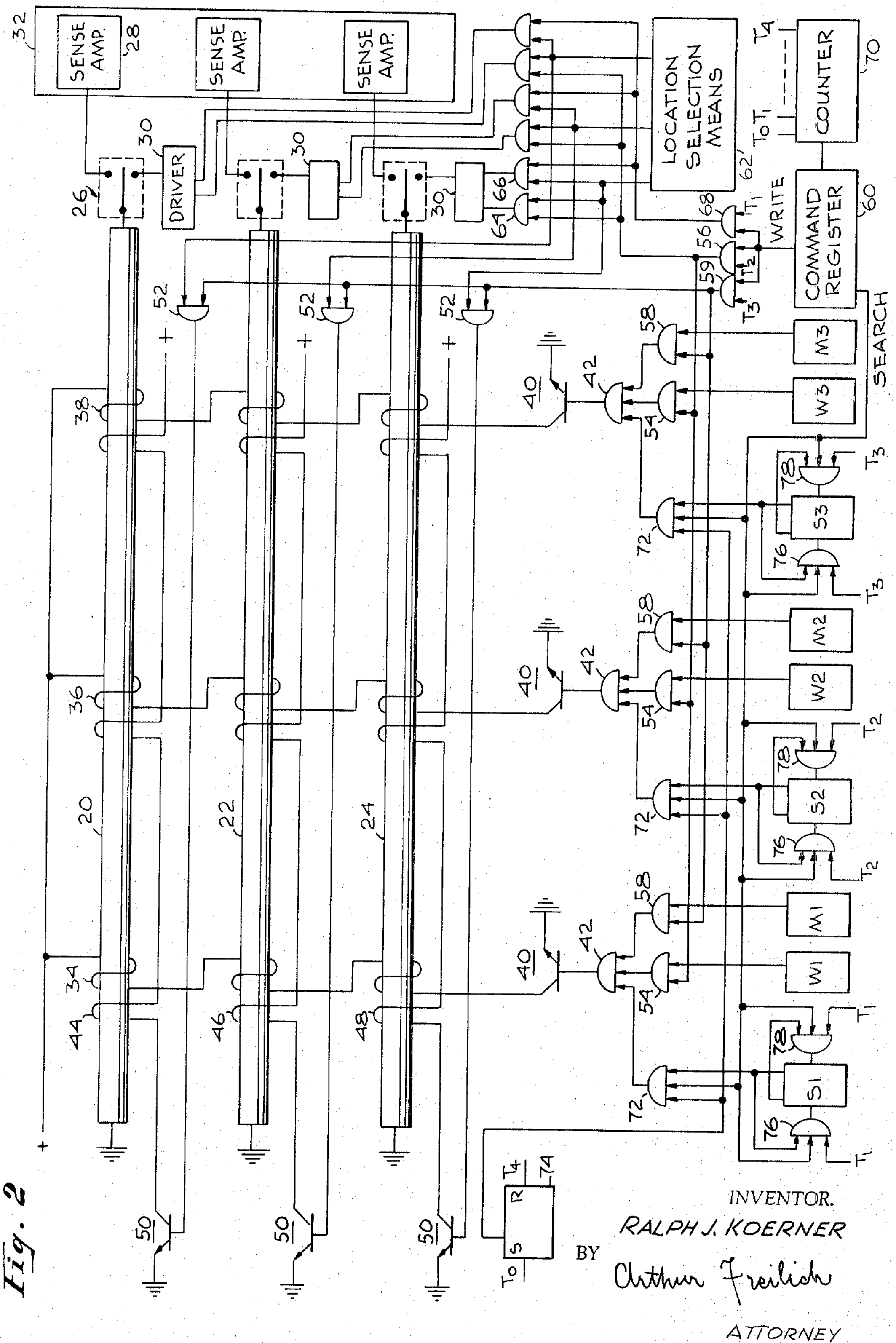
FIG. 2 is a schematic diagram of a content addressable memory in accordance with the invention and employing the storage device of FIG. 1(*a*).

Assume a content addressable memory comprised of three word locations, each word location including three memory cells. The storage media in the memory of FIG. 2 are identical to that disclosed in FIG. 1. That is, each storage location is defined by a different wire storage element 20, 22, 24.

The left terminal of each of the storage element wires is connected to a source of reference potential, as ground, and the right terminal thereof is connected to a different switching device 26 which can selectively couple the wire to either a sense amplifier 28 or a driver 30. The sense amplifiers 28 are connected together in a selection device 32 of, for example, the type disclosed in U.S. patent application Serial No. 296,001, filed on July 18, 1963 by Robert N. Mellott and assigned to the same assignee as the present application.

A transverse field producing digit line solenoid 34 is coupled to each of the wire storage elements 20, 22, and 24. Similarly, solenoids 36 and 38, spaced from solenoid 34 and from one another, are coupled to the wire storage elements 20, 22, and 24. Each of the solenoids 34, 36, and 38 defines a different storage cell on each of the wire storage elements, and thus each location has three storage cells. Each of the solenoids 34, 36, 38 is connected between a source of positive potential and the collector of a different NPN transistor 40. The emitters of the transistors 40 are connected to ground while the bases thereof are each connected to the output of a different OR gate 42.

A transverse field producing word line solenoid 44 is coupled to all of the cells in wire storage element 20. Similarly, solenoids 46 and 48 are coupled to all of the cells in wire storage elements 22 and 24. Each of the solenoids 44, 46, and 48 is connected between a source of positive potential and the collectors of different NPN transistors 50 whose emitters are connected to ground and whose bases are each connected to the output of a different AND gate 52.

A write register consisting of flip-flops W1, W2, and W3 is provided for storing words to be written into the memory. The true output terminal of each of the flip-flops W1, W2, and W3 is connected to the input of a different AND gate 54. The output of each gate 54 is connected to the input of a different OR gate 42. A second input to each of the AND gates 54 is derived from the output of an AND gate 56.

A mask register comprised of flip-flops M1, M2, and M3 is provided for the purpose of defining memory cells whose information is to be masked. The true output terminal of each of the flip-flops M1, M2, and M3 is connected to the input of a different AND gate 58. The output of each gate 58 is connected to the input of a different OR gate 42. The second input to each of the AND gates 58 is derived from the output of an AND gate 59.

In order to write information into the memory, a write command is entered (by means not shown) into a command register 60 and information is entered (by means not shown) into a location selection means 62 which identifies a particular location in the memory. The information entered into the location selection means can be in the form of a location address. Consequently, the location selection means 62 is provided with three separate output terminals, each corresponding to a different one of the memory locations and each being connected to the input of a different AND gate 52, a different AND gate 64, and a different AND gate 66. Each of the drivers 30 is provided with a pair of input terminals which are respectively connected to the outputs of a different pair of AND gates 64 and 66. The output of AND gate 56 is applied to the input of all of the AND gates 64, the output of AND gate 59 is applied to the input of all of the AND gates 52, and the output of AND gate 68 is applied to the inputs of all of the AND gates 66.

When an AND gate 66 applies an output signal to the right input terminal of a driver 30, the driver provides a large positive output pulse, as illustrated in FIG. 1(*b*) at time $t_a$, in order to switch all of the cells associated therewith to a binary "0" state. On the other hand, when an AND gate 64 applies an output pulse to the left input terminal of a driver 30, the driver provides a small negative output pulse as indicated in FIG. 1(*b*) at time $t_b$.

A counter 70 is provided which can define a plurality of successive time slots respectively identified as $t_0$ through $t_4$. The counter 70 is provided with output terminals, $T_0$ through $T_4$, which become true in succession for periods which represent the time slots. The command register 60 is connected to the counter 70 so that operation of the counter 70 is initiated in response to a command being entered into the command register 60. The output terminals $T_1$, $T_2$, and $T_3$ of counter 70 are respectively connected to the inputs of AND gates 68, 56, and 59. In order to write information into one of the memory locations, the address of that location (let it be assumed to be storage element 24) is entered into the selection means 62 and a write command is entered into the register 60 which initiates operation of the counter 70. In response to a write command being entered into the register 60, the switch means 26 are caused (by means not shown) to couple the storage element wires 20, 22, and 24 to their respective drivers 30. At time $t_1$, AND gate 68 is enabled to in turn enable one of the AND gates 66 to cause the driver connected thereto to switch all of the cells in element 24 to a binary "0" state. At time $t_2$, AND gate 56 will be enabled to in turn enable AND gate 64 to cause the driver connected to element 24 to provide a small negative pulse. The true output signal provided by AND gate 56 will also enable those AND gates 54 connected to write register flip-flops in a true state. Assume for example that flip-flop W2 is in a true state and that as a consequence the AND gate 54 connected thereto is enabled to in turn apply an enabling signal to the base of transistor 40 whose collector is connected to solenoid 36. As a result, a current will be initiated in solenoid 36 to cause a binary "1" to be written into cell two on wire 24. If flip-flops W1 and W3 are in a false state, then cells one and three on wire 24 will remain in a binary "0" state.

At time $t_3$, AND gate 59 will be enabled to in turn enable the AND gate 52 connected to the base of the transistor 50 coupled to the transverse field producing word line solenoid 48. As a result, a pulse will be produced in word line solenoid 48 of the type shown at time $t_e$ in FIG. 1(*b*). The output of AND gate 59 is also connected to the input of each of AND gates 58 to enable those AND gates which are connected to mask register flip-flops in a true state. Thus, let it be assumed that the information in cell three of wire 24 is to be masked. Thus, flip-flop M3 will define a true state, and during time slot $t_3$ a current will be developed in digit line solenoid 38. As a consequence of currents being developed in both digit line solenoid 38 and word line solenoid 48, the cell three domain on wire 24 will be shattered.

A search register consisting of flip-flops S1, S2, and S3 is provided for storing a search word. The technique for simultaneously comparing the search word with each of the words stored in memory can essentially comprise that described in U.S. patent application Serial No. 269,009, filed on March 29, 1963 by Ralph J. Koerner and A. D. Scarbrough, and assigned to the same assignee as the present application. Briefly, the search technique comprises interrogating the memory by increasing the current in each digit line corresponding to a search bit in a binary "1" state and decreasing the current in each digit line corresponding to search bits in a binary "0" state. As can be noted at times $t_c$ and $t_d$ in FIG. 1(*b*), when the current in the digit line increases and a memory cell coupled thereto stores a binary "0" ($t_c$), a positive output pulse will be developed on the wire, and similarly when the current on the digit line decreases, a positive pulse will be developed on the wire when a binary "1" is stored ($t_d$). Thus, whenever a positive output pulse appears on a wire, it can be interpreted as meaning that the state of the memory cell inducing that output pulse mismatches the state of the corresponding search bit.

At time $t_0$, currents are initiated in all of those digit line solenoids associated with search bits defining a binary "0" state. This is accomplished by connecting the false output terminal of each of flip-flops S1, S2, and S3 to the input of a different AND gate 72. A second input to each of the AND gates 72 is derived from the true output terminal of a flip-flop 74 which is set during time slot $t_0$ defined by counter 70 and reset during time slot $t_4$. The search output terminal of the command register 60 is also connected to the inputs of each of the AND gates 72. The state of each of the flip-flops S1, S2, and S3 is respectively switched during time slots $t_1$, $t_2$, and $t_3$. In order to accomplish this switching, AND gates 76 and 78 are respectively coupled to the set and reset input terminals of each of the search register flip-flops. The search output terminal of the command register 60 is connected to the input of each of the AND gates 76 and 78. The false output terminal of each search register flip-flop is connected to the input of an associated AND gate 76, while the true output terminal of each search register flip-flop is connected to the input of an associated AND gate 78. Output terminals $T_1$, $T_2$, and $T_3$ of the counter 70 are respectively connected to the AND gates 76 and 78 coupled to the input terminals of flip-flops S1, S2, and S3.

In order to perform a search, the search command is entered into the register 60, and operation of the counter 70 is initiated. At time $t_0$, currents are initiated in those digit line solenoids associated with search register flip-flops storing a binary "0." In each of time slots $t_1$, $t_2$, and $t_3$, currents in the digit line solenoids 34, 36, and 38 are either increased or decreased depending upon the states defined by the flip-flops S1, S2, and S3 and positive output pulses are induced in the wires when the states defined by the memory cells mismatch the states defined by the corresponding search register flip-flop except, however, that those cells in which the domain has been shattered will induce no output pulse on the wires regardless of what the search bits are. Of course, when a search command is in the command register 60, the switch means 26 couple the wires to the sense amplifiers 28. The sense amplifiers 28 have a memory capability and respond only to positive pulses, i.e., mismatch signals. Prior to initiating a search, all sense amplifiers 28 are switched to a match state. In the course of the search, those sense amplifiers associated with locations storing words mismatching the search word will be switched to a mismatch state, and those sense amplifiers associated with locations storing words whose unmasked portions match the search word will remain in a match state. Thus, by examining the states of sense amplifiers 28 at the completion of a search, all those words stored in memory matching the search word can be determined.

From the foregoing description, it should be appreciated that a three state digital storage device has been disclosed herein which can find utility in many different memory applications but which is extremely useful in content addressable memories, inasmuch as its use permits selected portions of selected stored words to be easily masked.

The embodiments of the invention in which an exclusive property or privilege is claimed are defined as follows:

1. A three state storage device comprising:
   a magnetic film having a magnetic field domain with a preferred anisotropic axis;
   means for selectively developing a magnetic field extending in a first direction parallel to said anisotropic axis for orienting the magnetic field in said domain in a first direction parallel to said axis;
   means for selectively developing a magnetic field extending in a second direction parallel to said anisotropic axis for orienting the magnetic field in said domain in a second direction parallel to said axis; and
   means for selectively developing a magnetic field above a predetermined amplitude extending transverse to said anisotropic axis for shattering said domain to thereby develop a plurality of independent mutually cancelling domains.

2. A three state storage device comprising:
a conductive wire having a magnetic film deposited peripherally around the surface thereof;
said film having a magnetic field domain with a preferred anisotropic axis extending peripherally around said wire;
means for selectively developing a magnetic field extending in a first direction parallel to said anisotropic axis for orienting the magnetic field in said domain in a first direction parallel to said axis;
means for selectively developing a magnetic field extending in a second direction parallel to said anisotropic axis for orienting the magnetic field in said domain in a second direction parallel to said axis; and
means for selectively developing a magnetic field above a predetermined amplitude extending transverse to said anisotropic axis for shattering said domain to thereby develop a plurality of independent mutually cancelling domains.

3. The device of claim 2 including means for interrogating said storage device comprising means for selectively developing a magnetic field below a predetermined amplitude extending transverse to said anisotropic axis.

4. The device of claim 2 wherein said means for selectively developing magnetic fields extending in said first and second directions respectively comprises means for driving currents in first and second directions along said conductive wire and wherein said means for selectively developing a magnetic field extending transverse to said anisotropic axis includes a solenoid coil wound about said conductive wire.

5. A digital memory comprising a matrix of intersecting rows and columns of memory cells;
each of said memory cells including a magnetic domain with a preferred anisotropic axis;
a plurality of conductive wires each coupled to all of the cells of a different one of said rows;
means for selectively driving current in first and second directions through said conductive wires for developing magnetic fields respectively extending in first and second directions parallel to said anisotropic axes for orienting said domains in first and second directions to respectively define first and second states;
a plurality of first solenoids each coupled to all of the cells of a different one of said columns;
a plurality of second solenoids each coupled to all of the cells of a different one of said rows;
means for simultaneously applying signals to selected first and second solenoids for respectively developing aiding first and second magnetic fields extending transverse to said anisotropic axes for shattering the domains in the cells coupled thereto to thereby define third states; and
means for applying a signal to a selected one of said first solenoids for developing a magnetic field extending transverse to said anisotropic axes and for causing each cell coupled thereto defining a first state to develop a first polarity output signal, each cell coupled thereto defining a second state to develop an opposite polarity output signal, and each cell coupled thereto defining a third state to develop no output signal.

6. A memory system comprising:
a matrix of memory cells respectively including N rows of cells, each row comprising a memory location capable of storing a word, and Q columns of cells, each column including a correspondingly positioned memory cell from each location;
each of said memory cells comprising a magnetic device having a domain with a preferred anisotropic axis;
write means for selectively applying first and second oppositely oriented magnetic fields to each of said cells for respectively switching said cells to first and second states;
mask means for selectively applying a third magnetic field to each of said cells for shattering the domain therein to thereby define a third state; and
means for interrogating said memory cells for causing each of said cells defining a first state to provide a first polarity output signal, each of said cells defining a second state to provide a second polarity output signal, and each of said cells defining a third state to provide no output signal.

7. A content addressable memory comprising:
a matrix of memory cells respectively including N rows of cells, each row comprising a memory location capable of storing a word, and Q columns of cells, each column including a correspondingly positioned memory cell from each location;
Q storage cells;
means for selectively switching each of said memory cells to one of three states;
means for developing a plurality of binary signals each signal representative of the state of a different one of said Q storage cells and for applying said signals to corresponding memory cells for causing each of said memory cells defining a state matching the state represented by the binary signal associated therewith to provide a first output indication, each of said memory cells defining a state mismatching the state represented by the binary signal associated therewith to provide a second output indication, and each of said cells defining a third state to provide a third output indication; and
N sensing elements each adapted to sense the output indications provided by memory elements common to a different word location.

8. The content addressable memory of claim 7 wherein said first and second output indications respectively comprise opposite polarity electrical signals and wherein said third output indication comprises the absence of an electrical signal.

9. The content addressable memory of claim 7 wherein each of said memory cells comprises a magnetic film having a magnetic field domain with a preferred anisotropic axis and including:
means for selectively developing a magnetic field extending in a first direction parallel to said anisotropic axis for orienting the magnetic field in said domain in a first direction parallel to said axis;
means for selectively developing a magnetic field extending in a second direction parallel to said anisotropic axis for orienting the magnetic field in said domain in a second direction parallel to said axis; and
means for selectively developing a magnetic field above a predetermined amplitude extending transverse to said anisotropic axis for shattering said domain to thereby develop a plurality of independent mutually cancelling domains.

10. A content addressable memory comprising:
a matrix of memory elements respectively including N rows of elements, each row comprising a memory location capable of storing a word, and Q columns of elements, each column including a correspondingly positioned memory element from each location;
Q storage elements;
a plurality of digit lines each of which is associated with all of the elements of a different one of said matrix columns and a different one of said Q storage elements;
a plurality of word lines each of which is associated with all of the elements of a different one of said matrix rows;
means including said digit lines and word lines for selectively switching each of said memory elements to one of three states;

means for applying binary signals to said digit lines, each signal representative of the state of a different one of said Q storage elements for causing each of said memory elements defining a state matching the state represented by the binary signal applied to the digit line associated therewith to provide a first polarity output signal on the word line associated therewith, each of said memory elements defining a state mismatching the state represented by the binary signal applied to the digit line associated therewith to provide a second polarity output signal on the word line associated therewith, and each of said elements defining a third state to provide no output signal on the word line associated therewith; and N sensing elements each adapted to sense the output signal provided on a different one of said word lines.

11. The content addressable memory of claim 10 wherein said binary signals are sequentially applied to said digit lines in order of the numerical significance of the Q storage elements associated therewith.

12. A content addressable memory comprising:

a matrix of memory elements respectively including N rows of elements, each row comprising a memory location capable of storing a word, and Q columns of elements, each column including a correspondingly positioned memory element from each location;

each of said memory elements including a magnetic domain defining uniaxial magnetic field anisotropy;

Q storage elements;

a plurality of transverse magnetic field producing digit lines each of which is associated with all of the elements of a different one of said matrix columns and a different one of said Q storage elements;

a plurality of transverse field producing word lines each of which is associated with all of the elements of a different one of said matrix rows;

a plurality of axial field producing word lines each of which is associated with all of the elements of a different one of said matrix rows;

means including said transverse field producing digit lines and said axial field producing word lines for selectively switching each of said memory elements to either a first or second state;

means including said transverse field producing digit lines and said transverse field producing word lines for switching selected ones of said memory elements to a third state;

means for applying binary signals to said digit lines, each signal representative of the state of a different one of said Q storage elements for causing each of said memory elements defining a state matching the state represented by the binary signal applied to the digit line associated therewith to provide a first polarity output signal on the word line associated therewith, each of said memory elements defining a state mismatching the state represented by the binary signal applied to the digit line associated therewith to provide a second polarity output signal on the word line associated therewith, and each of said elements defining a third state to provide no output signal on the word line associated therewith; and N sensing elements each adapted to sense the output signal provided on a different one of said word lines.

References Cited

UNITED STATES PATENTS

| | | | |
|---|---|---|---|
| 3,069,661 | 12/1962 | Gianola | 340—174 |
| 3,093,818 | 6/1963 | Hunter | 340—174 |

FOREIGN PATENTS

| | | |
|---|---|---|
| 870,108 | 6/1961 | Great Britain. |

OTHER REFERENCES

Russell, L. A.: "Non-Destructive Read for Thin Film Storage Device," in IBM Technical Disclosure Bulletin, November 1960, vol. 3, No. 6, p. 56.

BERNARD KONICK, *Primary Examiner.*

IRVING L. SRAGOW, *Examiner.*

H. D. VOLK, P. SPERBER, *Assistant Examiners.*